United States Patent [19]

Milton

[11] 4,232,877
[45] Nov. 11, 1980

[54] DUAL BALL TOWING HITCH
[76] Inventor: Russell E. Milton, 712 E. 4th St., Alturas, Calif. 96101
[21] Appl. No.: 29,023
[22] Filed: Apr. 11, 1979
[51] Int. Cl.³ .............................................. B62D 53/00
[52] U.S. Cl. ................................ 280/415 A; 280/504; 403/3
[58] Field of Search .............. 280/415 R, 415 A, 504, 280/511; 73/193; 403/3, 4, 76, 77, 78

[56] References Cited
U.S. PATENT DOCUMENTS

| | | | |
|---|---|---|---|
| 2,447,109 | 8/1948 | Billeter | 73/139 |
| 3,801,134 | 4/1974 | Dees | 280/415 A |
| 3,922,006 | 11/1975 | Borges | 280/415 A |
| 3,963,264 | 6/1976 | Down | 280/415 A |

Primary Examiner—John J. Love
Assistant Examiner—Randall A. Schrecengost
Attorney, Agent, or Firm—Robert R. Tipton

[57] ABSTRACT

A dual ball towing hitch utilizes a first ball member having a first base support portion and a second ball member having a second base support portion which are connected to each other and a vehicle towbar by a common stud engaging each ball member through its support portion. The stud passes through a hole in the towbar whereby the base support portion of each ball member frictionally engages the towbar on opposite sides thereof. A hole in each ball member is adapted to receive a torque wrench and a counter-torque bar, respectively, to tighten the ball members to a predetermined frictional torque.

5 Claims, 6 Drawing Figures

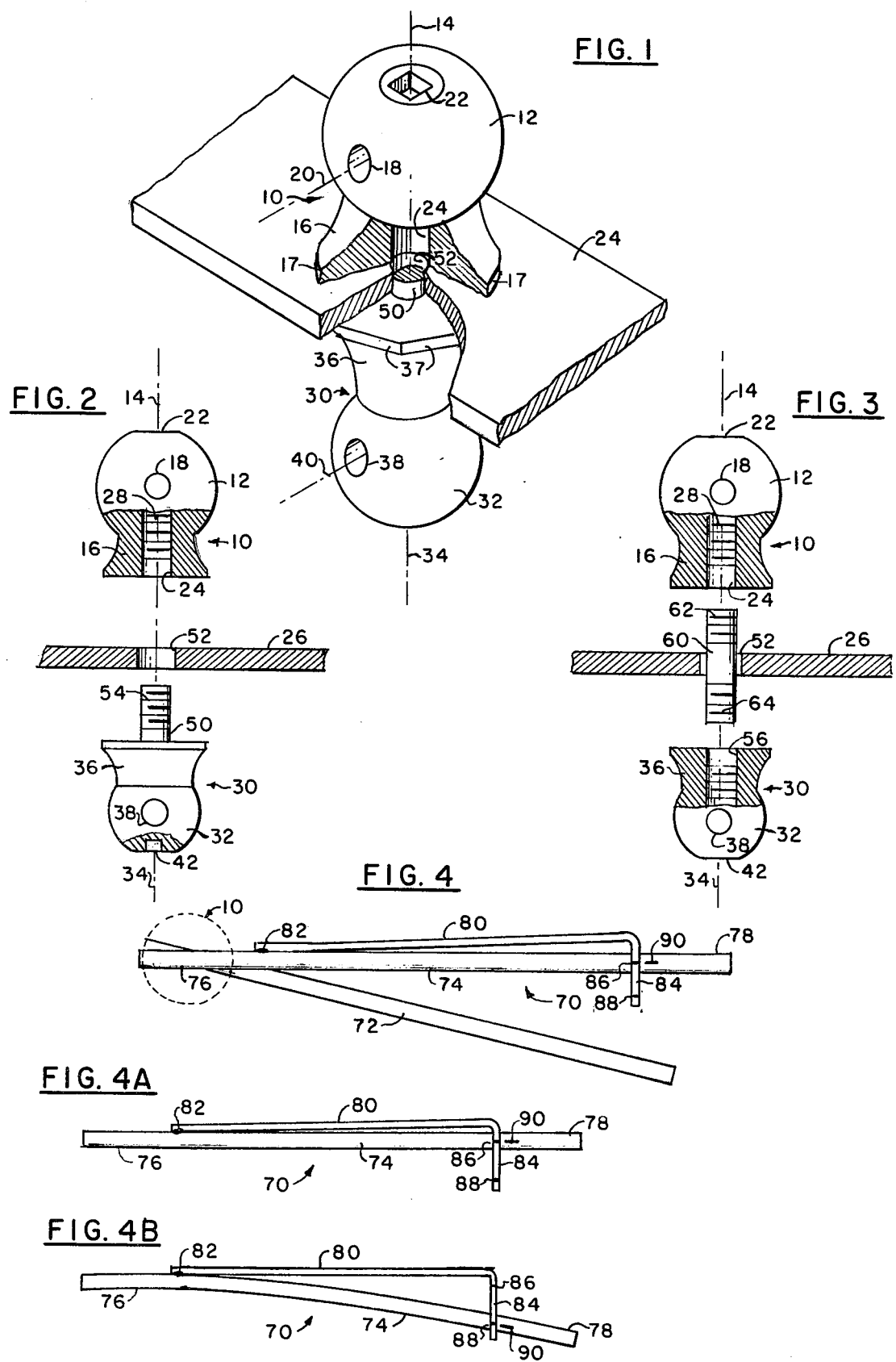

DUAL BALL TOWING HITCH

BACKGROUND OF THE PRIOR ART

This invention relates generally to towing devices and in particular to multiple ball and socket towing hitches.

The multiple ball and socket towing hitches of the prior art utilize, in a number of cases, turret-like configurations in which the various sized towing balls were disposed about a common support or turret member that is rotated to bring the appropriate size ball to a vertical position.

In some devices the support or turret member rotates about a horizontal axis in line with the direction of travel of the vehicle.

In other devices, the common support or turret member rotates about a horizontal axis normal or perpendicular to the direction of travel of the vehicle.

In still other devices, the common support or turret member rotates about a vertical axis.

In all cases, the devices of the prior art are mechanically complicated and required numerous parts in their manufacture thus increasing the cost and effort of production.

SUMMARY OF THE INVENTION

The device of the present invention is a much simpler configuration which eliminates the use of a turret and other unnecessary parts but provides a dual ball advantage in that it comprises, basically, a first ball member having a spheroid portion connected to a base support portion, a second ball member also having a spheroid portion, but of smaller diameter, connected to a second base support portion. Each ball member further comprises a hole therein adapted to receive a torque wrench and a counter-torque bar, respectively. A threaded hole in the base support portion of one ball member is adapted to receive a threaded stud connected to the base support portion of the other ball member. The threaded stud is also adapted to be received through a hole on the towbar whereby the ball members are attached to each other and the towbar in a rigid configuration. A torque wrench, having an "L" shaped fixed member overlapping the handle end of a main resilient tension member, is adapted to engage a hole in one of the ball members. A counter-torque bar is adapted to engage the other hole in the other ball member whereby the ball members can be rotated about the stud and a torque applied to produce a predetermined torsional friction against the towbar. The base support portions also have faces or facets about the periphery thereof to receive a spanner or open end wrench.

It is, therefore, an object of the present invention to provide a dual ball towing hitch for a vehicle.

It is a further object of the present invention to provide a dual ball towing hitch having few parts.

It is another object of the present invention to provide a dual ball towing hitch for a vehicle that can be tightened to a predetermined torsional friction.

It is still a further object of the present invention to provide a dual ball towing hitch for a vehicle which includes in its combination a torque wrench.

It is still a further object of the present invention to provide a dual ball towing hitch for a vehicle including a torque wrench having a main body member and an "L" shaped fixed member overlapping the handle portion thereof for connection thereto calibrated for a predetermined torque applied to said dual ball hitch.

These and other objects of the present invention will be manifest upon careful study of the following detailed description when taken with the drawings.

BRIEF DESCRIPTION OF THE DRAWINGS

FIG. 1 is an isometric view of the assembled dual ball towing hitch of the present invention.

FIG. 2 is an elevational exploded view of the dual ball towing hitch of the present invention utilizing a stud attached to one ball member.

FIG. 3 is an elevational exploded view of the dual ball towing hitch of the present invention utilizing a separate double end threaded stud for connecting the ball members together.

FIG. 4 is a top view of the torque wrench used in conjunction with the dual ball towing hitch of the present invention.

FIG. 4A is a top view of the torque wrench of FIG. 4 showing the wrench in the zero torque position.

FIG. 4B is a top view of the torque wrench of FIG. 4 showing the wrench at its maximum predetermined torque position.

DESCRIPTION OF THE PREFERRED EMBODIMENT

With reference to FIG. 1 there is illustrated the assembled dual ball towing hitch of the present invention which comprises, basically, a first ball member 10 comprising a first spheriod portion 12 having a vertical axis of rotation 14 and attached to which is first base support portion 16. A first hole 18 is located in first ball member 10 shown in FIG. 1 as passing through first spheroid portion 12. The axis of rotation 20 of first hole 18 is arranged to be generally perpendicular to axis of rotation 14 of spheroid portion 12.

A first square hole 22 is located in first spheroid portion 12 at its top and having its center coincident with vertical axis of rotation 14 of spheroid portion 12.

A second hole 24 is located in first base support portion 16 with its axis of rotation coincident with the vertical axis of rotation of spheroid portion 12.

The lower surface of base support portion 16 is adapted to rest on and frictionally engage towbar 24 which is attached to a vehicle (not shown). Disposed about the lower outer periphery of base support portion 14 are flat faces or facets 17 adapted to engage a spanner or open end wrench.

A second ball member 30 is located under towbar 24 and comprises a second spheroid portion 32 having a vertical axis of rotation 34 which is also coincident with the vertical axis of rotation 14 of first spheroid portion 12. Connected to second spheroid portion 32 is a second base support portion 36. A first hole 38 having an axis of rotation 40 is disposed in second ball member 30 passing through, as shown in FIG. 1, spheroid portion 32 with its axis of rotation generally perpendicular to the vertical axis of rotation 34 of spheroid portion 32.

The bottom portion of base support portion 36 is also adapted to rest against towbar 24 and frictionally engage it. Disposed about the lower outer periphery of base support portion 36 are flat faces or facets 37 adapted to engage a spanner or open end wrench.

As shown in FIG. 1 a stud or bolt 50 is attached to second ball member 30 and projects up through hole 52 in towbar 24 to engage first ball member 10.

A square hole 42 (FIGS. 2 and 3) is also located in second spheroid portion 32 distal base support portion 34 and having its center coincident with the vertical axis of rotation 34 of spheroid portion 32.

With reference to FIG. 2 there is illustrated an elevational exploded view of one version of the dual ball towing hitch of the present invention in which a single threaded end stud is used to connect first ball member 10 to second ball member 30.

In FIG. 2, first base support portion 16 is provided with a hole 24, described above, having its axis of rotation coincident with the vertical axis of rotation 14 of spheroid portion 12. Inside hole 24 are threads 28 which are adapted to engage threads 54 of stud 50. Stud 50 is attached at one end to second base support portion 36 of second ball member 30, and indeed can be fabricated out of the same material as second ball member 30, such that the axis of rotation of stud 54 is coincident with the vertical axis of rotation 34 of second ball member 30.

Vertical axis of rotation 34 of second ball member 30 is also seen to be coincident with the vertical axis of rotation 14 of first ball member 10.

As can be seen in FIG. 2, stud 50 is adapted to pass through hole 52 in towbar 26, such that when all the members are fastened together they form a tight rigid unit, one tow ball being on the top portion of towbar 26 and the other tow ball being on the underside of towbar 26.

With reference to FIG. 3 there is illustrated a further embodiment of the dual ball towing hitch of the present invention in which a separate double threaded stud is used to connect the first and second ball members together. The dual tow ball towing hitch embodiment of FIG. 3 comprises, basically, the same elements as shown in FIG. 1 including first ball member 10 having a first spheroid portion 12 connected to a first base support portion 16. A hole 24 is located passing through first base support portion 16 and having an axis of rotation that is coincident with the vertical axis 14 of spheroid portion 12. Ball member 30, in addition to the elements shown in FIG. 2, further comprises a hole 56 whose axis of rotation is coincident with the vertical axis of rotation 34 of second spheroid portion 32 and base support portion 36.

Inside of hole 24 are disposed threads 28 which are adapted to engage threads 52 of stud member 60. In a like manner threads 58 disposed in hole 56 are adapted to engage threads 64 at the other end of stud member 60. Stud member 60 is also adapted to pass through hole 52 of towbar 26.

It will be noted that the vertical axis of rotation 14 of first ball member 10 and the vertical axis of rotation 34 of second ball member 30 along with the vertical axis of rotation of stud member 60 are all coincident with each other. When all are engaged, they become a rigid unit attached to towbar 26.

To use the dual ball towing hitch of the present invention, first ball member 10 having one size spheroid portion 12 is placed to receive stud 54 (or 60) on one side of towbar 26 while second ball member 30 having a spheroid portion 30 of a different diameter, is placed on the underside of towbar 26 and the entire unit screwed together utilizing the various threaded portions until the base support portion of each ball member is firmly engaged against towbar 26.

In that configuration, it is necessary that sufficient torque be applied to the two ball members to assure that the ball members will not slip and become loose, thus creating a dangerous towing condition.

To accomplish this, a torque wrench is provided to engage either hole 18 in spheroid portion 12 or hole 38 in spheroid portion 32 along with a counter-torque bar member to provide leverage when tightening the two balls about towbar 26.

With reference to FIG. 4 a torque wrench 70 is used along with a counter-torque bar 72 to assure the proper frictional torque is achieved against towbar 26.

Torque wrench 70 comprise, basically, a resilient tension bar member 74 having a connector end 76 and a handle end 78. An "L" shaped fixed member 80 is disposed along resilient tension member 74 having one end attached, as by welding or the like, at end 82 to resilient tension member 74 proximate connector end 76 and with the other end of fixed member 80 bent 90 degrees to define a short leg "L" 84 on which is marked indicia 86 and 88 corresponding to maximum and zero torque units which are adapted to align with indicia 90 at the handle end 78 of resilient tension bar member 74.

With reference to FIG. 4A torque wrench 70 is shown in the zero torque condition wherein indicia 86 is aligned with indica 90 at the handle end of resilient tension member 74.

As show in FIG. 4B, torque wrench 70 is shown in its maximum torque position whereby resilient tension member 74 is bend resiliently such the indicia 88 becomes aligned with indicia 90 indicating that the predetermined torsional force applied to tow ball members 10 and 30 has been reached.

In practice, resilient tension member 74 is fabricated out of a spring steel or the like such as a vanadium steel to permit flexure under a torsional force and return to its original shape without exceeding the elastic limit of the material.

From FIGS. 4A and 4B it can be seen that by virture of its point of attachment proximate the connector end 76 of resilient tension member 74, "L" shaped member 80 remains relatively fixed or immobile allowing resilient tension member 74 to bend or flex between indicia 86 and indicia 88.

Thus by placing connector end 76 of tension member 74 in hole 18 of first spheroid portion 12 and counter-torque bar 72 in hole 38 of second spheroid portion 32, a torque can be applied to ball members 10 and 30 whereby they can be tightened to a predetermined torque.

I claim:

1. A trailer hitch comprising
a first ball member comprising a first spheroid portion having a vertical axis of rotation,
a first base support portion connected to said first spheroid portion, said first base support portion having an axis of rotation coincident with said vertical axis of rotation of said first spheroid portion,
means defining a first hole in said first ball member, said first hole intersecting said vertical axis of rotation of said first spheroid portion, with the axis of rotation of said first hole perpendicular to said vertical axis of rotation of said first spheroid portion,
means defining a second hole projecting through said first base support portion a part of the distance through said first ball member, the axis of rotation of said second hole being coincident with the vertical axis of rotation of said first spheroid portion, a second ball member comprising a second spheroid portion having a vertical axis of rotation, a second base support portion connected to said second spheroid portion, said second base support portion having an axis of rotation coincident with said vertical axis of rotation of said second spheroid portion, means defining a third hole in said second ball member, said third hole intersecting said vertical axis of rotation of said second spheroid portion, with the axis of rotation of said third hole perpendicular to said vertical axis of rotation of said second spheroid portion, a towbar attached to a vehicle, and means for connecting said first ball member to said second ball member and to said towbar, with said vertical axis of said first spheroid portion coincident with the vertical axis of rotation of said second spheroid portion.

2. The trailer hitch as claimed in claim 1 wherein said means for connecting said first ball member to said second ball member and to said towbar comprises a stud connected to said second base support portion of said second ball member and having its axis of rotation coincident with the axis of rotation of said second spheroid portion, means defining a towbar hole in said towbar adapted to receive said stud, said stud further comprising a set of first threads thereon, and said second hole in said first ball member having a set of second threads thereon adapted to receive and engage said stud and said first threads, whereby said first ball member is rigidly connected to said second ball member and said towbar.

3. The trailer hitch as claimed in claim 1 wherein said second ball member comprises means defining a fourth hole projecting through said second base support portion a part of the distance through said first ball member, the axis of rotation of said fourth hole being coincident with the vertical axis of rotation of said spheroid member, and said means for connecting said first ball to said second ball member and to said towbar comprises a third set of threads located inside said second hole in said first ball member, a fourth set of threads located inside said fourth hole in said second ball member, and a stud threaded at each end and with the ends of said stud adapted to be received in said second and fourth holes and engage said third and fourth set of threads, respectively, and means defining a hole in said towbar adapted to receive said stud, whereby said first ball member is rigidly connected to said second ball member and said towbar.

4. The trailer hitch as claimed in claim 1 further comprising means defining a first square hole in said first spheroid portion of said first ball member distal said second hole in said first base portion, said first square hole having its center coincident with said vertical axis of rotation of said first pheroid portion, and means defining a second square hole in said second spheroid portion of said second ball member distal said second base portion, said second square hole having its center coincident with said vertical axis of rotation of said second spheroid portion.

5. The trailer hitch as claimed in claim 1 further comprising a torque wrench comprising a main tension member having a connector end and a handle end, said connector end adapted to be received in and engage said first hole in said first spheroid portion, a fixed member having one end attached to said main tension member proximate said connector end, and having the other end of said fixed member bent 90 degrees to define a short leg of an "L," said "L" leg overlapping said main tension member proximate said handle end, indicia disposed on said short leg "L" calibrated in torsion units, and a counter torsion member having a connector end and a handle end, said connector end adapted to engage said third hole in said second spheroid member.

* * * * *